United States Patent
Moreth et al.

(10) Patent No.: US 7,262,388 B2
(45) Date of Patent: Aug. 28, 2007

(54) VEHICLE LIGHT HEATER

(75) Inventors: Cary Moreth, Bloomingdale, IL (US); Edward F. Bulgajewski, Genoa, IL (US); Erik Arnold, Gorxheimertal (DE)

(73) Assignee: Illinois Tool Works Inc, Glenview, IL (US)

( * ) Notice: Subject to any disclaimer, the term of this patent is extended or adjusted under 35 U.S.C. 154(b) by 0 days.

(21) Appl. No.: 11/116,794

(22) Filed: Apr. 28, 2005

(65) Prior Publication Data
US 2006/0245202 A1 Nov. 2, 2006

(51) Int. Cl.
*H05B 3/00* (2006.01)
*B60Q 1/00* (2006.01)

(52) U.S. Cl. .............. 219/220; 219/202; 219/522; 219/541; 219/540; 362/311; 362/541; 362/455; 362/547

(58) Field of Classification Search .......... 219/220, 219/202, 205, 217, 504, 522, 548; 362/294, 362/545, 547, 548
See application file for complete search history.

(56) References Cited

U.S. PATENT DOCUMENTS

| | | | |
|---|---|---|---|
| 1,925,423 A * | 9/1933 | Stutzman et al. ........... | 219/220 |
| 1,951,902 A | 3/1934 | Dempsey | |
| 4,728,775 A * | 3/1988 | Van Straten ................ | 219/202 |
| 4,755,917 A | 7/1988 | Bals et al. | |
| 4,797,790 A | 1/1989 | Brodling et al. | |
| 4,931,627 A | 6/1990 | Watts | |
| 5,499,173 A * | 3/1996 | Yamamoto ................. | 362/460 |
| 5,897,802 A * | 4/1999 | Jones ......................... | 219/202 |
| 6,210,014 B1 | 4/2001 | Kubizne et al. | |
| 6,254,259 B1 | 7/2001 | Kobayashi | |
| 6,371,635 B2 * | 4/2002 | Ott et al. .................... | 362/511 |
| 6,384,538 B1 | 5/2002 | Lange et al. | |
| 6,422,729 B1 | 7/2002 | Rohrbach et al. | |
| 6,455,823 B1 * | 9/2002 | Bulgajewski et al. ....... | 219/548 |
| 6,495,222 B1 | 12/2002 | Mosser et al. | |
| 6,495,799 B1 | 12/2002 | Pillsbury, IV et al. | |
| 6,497,507 B1 | 12/2002 | Weber | |

(Continued)

FOREIGN PATENT DOCUMENTS

DE     199 62 214     6/2001

(Continued)

OTHER PUBLICATIONS

Patent Abstracts of Japan.

*Primary Examiner*—Philip H. Leung
*Assistant Examiner*—Vinod Patel
(74) *Attorney, Agent, or Firm*—Mark W. Croll; Paul F. Donovan

(57) ABSTRACT

The present invention is directed to a system for reducing condensation on the inner surface of a vehicle light cover, and preventing or deicing ice build up on the exterior of the cover. In an embodiment, a heater is mounted to a carrier and the heat produced by the heater prevents the occurrence of condensation on the inner surface of the light cover or build up of ice on the outer surface. In an embodiment, one or more vents may be provided in the carrier and one or more corresponding holes may be provided in the heater so as to increase the flow of air across the inner surface of the light cover. A controller may be provided to control activation of the heater.

18 Claims, 4 Drawing Sheets

U.S. PATENT DOCUMENTS

| | | |
|---|---|---|
| 6,563,086 B1 * | 5/2003 | Meirndorf et al. .......... 219/220 |
| 6,601,983 B1 | 8/2003 | Runfola et al. |
| 6,676,283 B2 * | 1/2004 | Ozawa et al. ............... 362/547 |
| 6,710,302 B1 * | 3/2004 | Rennick .................... 219/202 |
| 6,734,404 B2 * | 5/2004 | Hays ......................... 219/552 |
| 6,883,948 B2 * | 4/2005 | VanDuyn et al. ........... 362/547 |
| 2001/0043477 A1 | 11/2001 | Ott et al. |
| 2003/0133310 A1 | 7/2003 | VanDuyn et al. |
| 2003/0218885 A1 | 11/2003 | Ishizaki |
| 2004/0042229 A1 | 3/2004 | Duarte et al. |
| 2004/0070339 A1 | 4/2004 | Suda et al. |

FOREIGN PATENT DOCUMENTS

| | | |
|---|---|---|
| DE | 10346270 | 7/2004 |
| DE | 10331835 | 2/2005 |
| DE | 10343015 | 4/2005 |
| EP | 0859188 | 8/1998 |
| FR | 2616206 | 9/1988 |
| JP | 06176605 | 6/1994 |
| JP | 2000340021 | 12/2000 |
| JP | 6254259 | 7/2001 |

* cited by examiner

VEHICLE LIGHT HEATER

FIELD OF THE INVENTION

The present invention relates generally to a heater and more particularly to a heater for use in a vehicle light assembly.

BACKGROUND OF THE INVENTION

Automobiles function in a range of environments and often encounter condensation or ice forming on surfaces. Ice build up on exterior vehicle components, such as headlamps and rear lights, is a common problem. In the case of condensation, warmer air can hold more moisture than colder air, thus the combination of relatively warm moist air with a cooler surface tends to generate condensation on the cooler surface. While it is possible for condensation to form on many parts of the automobile, condensation is most noticeable and objectionable on transparent surfaces such as an automobile windshield. Condensation tends to form on surfaces like windshields because interior air is relatively warm and moist, while the windshield is relatively cool due to the flow of cool exterior air over the windshield. Once the relatively warm and moist interior air contacts the windshield it tends to cool and condense on the inside of the windshield. Methods of controlling the formation of condensation (i.e., causing the condensation to evaporate) include lowering the level of moisture in the interior air, increasing the airflow across the inside of the windshield and further heating the air.

Automobiles are designed with a pair of headlamps and a pair of rear lights. Condensation and ice build up on vehicle light assemblies is quite common. In the past, headlamps were based on incandescent bulb technology, an example being a halogen bulb. Halogen bulbs were placed within an enclosure having a cover and light generated by the bulbs was directed out through the cover. Halogen bulbs generate heat along with the light. Although generating some heat, this heat is not sufficiently effective to prevent the formation of condensation on the cover. To improve illumination efficiency light emitting diode ("LED") based bulbs were designed to replace the halogen bulbs. LED based bulbs provide beneficial reductions in power consumption and generally last longer than other types of bulbs, but do not generate sufficient heat to prevent the accumulation of condensation on the inside of the cover. In addition, due to packing requirements and attempts to increase efficiency, the amount of air flowing through the headlamp enclosure has been substantially reduced. Therefore, substantial condensation issues exist, including not only the unsightly formation of condensation, but also the potential for reduced driver visibility. The present invention is directed at solving these and other known problems by providing a system that will inhibit the formation of condensation on the transparent cover of the headlamp assembly.

SUMMARY OF THE INVENTION

The present invention is directed towards a system for removing condensation from the inside of a light cover, and preventing or deicing ice build up on the outside of the light cover. A heater, which may be a positive temperature coefficient ("PTC") heater or a fixed resistance heater, is mounted to a carrier and the heater helps prevent the formation of condensation or ice on the light cover. In an embodiment, vents are provided in the carrier and/or the heater to aid in the prevention of condensation or ice build up.

Other features and advantages of the invention will become apparent to those skilled in the art upon review of the following detailed description, claims and drawings in which like numerals are used to designate like features.

Figure 1:
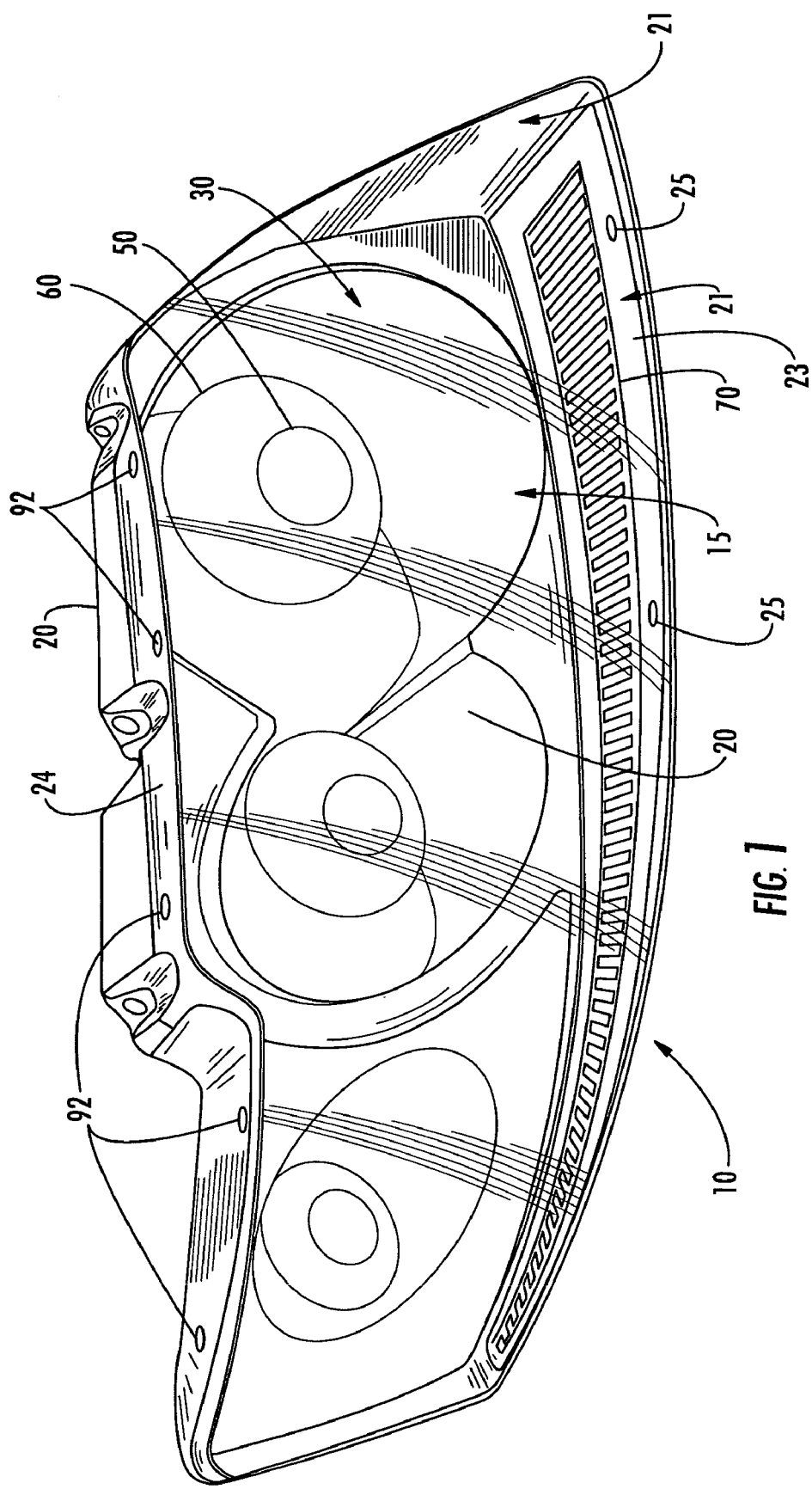
FIG. 1 is an isometric view of an exemplary head light assembly.

Before the embodiments of the invention are explained in detail, it is to be understood that the invention is not limited in its application to the details of construction and the arrangement of the components set forth in the following description or illustrated in the drawings. The invention is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF THE EMBODIMENTS

FIG. 1 depicts an exemplary embodiment of a headlight assembly 10. Although a headlight assembly is shown and described, the present invention is also suitable for use in other applications, such as rear light assemblies. The assembly includes an enclosure 15 formed by the combination of a carrier 20 and a diffuser 30. The diffuser 30 is typically a transparent cover and can be mounted to the carrier 20 as shown, or it can be mounted to a housing, or mounted directly to the vehicle. If desired, the carrier 20 and the diffuser 30 can even be integrated. A bulb 50 and a reflector 60 are mounted inside the enclosure 15. This mounting can take place by mounting the bulb 50 and the reflector 60 to the carrier 20, or by mounting the carrier 20 to the vehicle so as to enclose the bulb 50 and the reflector 60.

The diffuser 30 allows light from the bulb 50 to exit the assembly 10 to illuminate an area in front of the vehicle when the assembly is installed. To prevent the formation of condensation on the diffuser 30, a heater 70 is provided along an inner surface 21 of a wall 23 of the carrier 20. The heater 70, which may be a positive temperature coefficient ("PTC") heater, warms the air and helps prevent condensation from forming on the diffuser 30.

In certain designs, it may be desirable to also increase the air flow within the headlight assembly 10 in addition to heating the air so that the heater 70 does not have to use excessive amounts of power to produce sufficient heat. To increase air flow, one or more vents 92 can be included in or near a wall 24 of the enclosure. To even further increase airflow, one or more vents 25 can be included in the wall 23 so that air may enter the enclosure near the bottom through the one or more vents 25 and exit the enclosure near the top through the one or more vents 92. In an alternative embodiment, one or more vents 25 could be used without the one or more vents 92. Additional uses of the one or more vents 25 will be discussed below.

It should be noted that the heater 70 is provided for illustrative purposes. The actual shape and design and type of the heater 70 will vary according to vehicle requirements. Preferably, the heater 70 will not be visible when looking into the headlight assembly 10. In addition, while three bulbs are depicted in the light assembly 10, more or less bulbs can be used. To maximize efficiency, the bulb 50 can be a light emitting diode ("LED") bulb. Depending on the design of the bulb 50, the reflector 60 may not be required.

As is known, the shape of the headlight assembly can vary dramatically depending on style of the vehicle and the packaging requirements, thus FIG. 1 is merely illustrative of a possible headlight assembly shape. It should also be noted that additional trim pieces can be added to the inner surface 21 of carrier 20. These trim pieces can vary the aesthetic appearance of the headlight assembly. Furthermore, while the carrier 20 is depicted as a single piece, it can be formed of one or more pieces according to design and manufacturing requirements.

Figure 2:
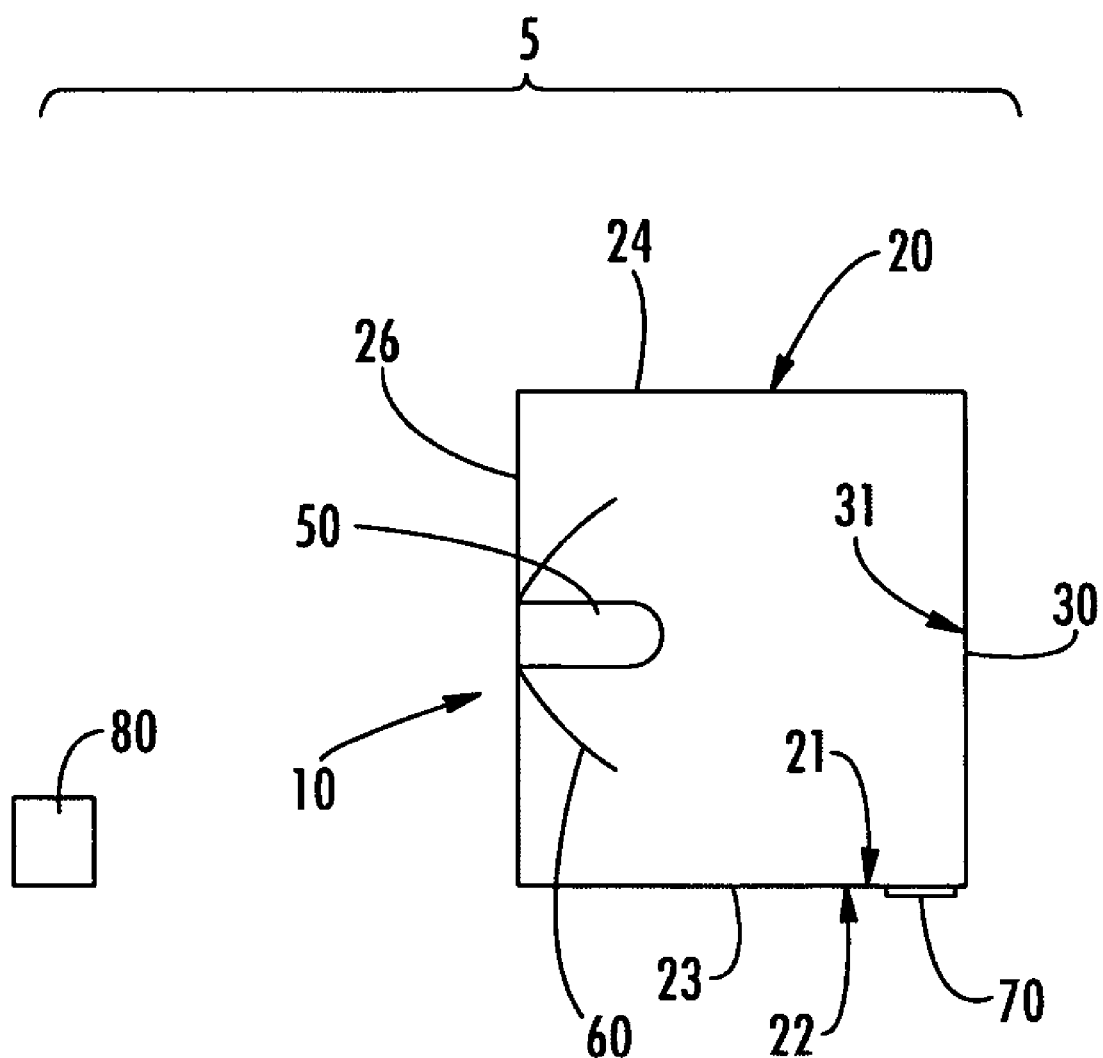
FIG. 2 is a cross-sectional diagram view of an exemplary head light assembly.

Referring to FIG. 2, a cross section of an exemplary headlight assembly is shown As discussed above, headlight assemblies can be designed in a variety of shapes and sizes, depending on the packaging requirements and the aesthetic appearance desired, thus the depicted cross section is simplified and is for illustrative purposes. The headlight assembly 10 includes the carrier 20 to which a diffuser 30 is mounted. The carrier 20 is configured to mount to the vehicle front end (not shown) and to provide a partial enclosure for one or more bulbs. The carrier 20 includes the wall 23, the wall 24, a wall 26, the inner surface 21 and an outer surface 22. The depicted bulb 50 is mounted in the carrier 20 and the reflector 60 is provided adjacent the bulb 50. Thus, the carrier 20 and diffuser 30 act as the housing for the bulb 50 and the reflector 60. Depending on the design of the assembly, additional structure may be used to form the housing in a known manner. For example, the wall 24 and/or the wall 26 may be formed, at least in part, by some other structure separate from the carrier 20. Depending on the design of the bulb 50, the reflector 60 may or may not be required.

As can be appreciated, condensation forming on an inside surface 31 of the diffuser 30 is aesthetically unpleasing and potentially harmful to the proper functionality of the headlight assembly 10. To help prevent the formation of condensation, the heater 70 is mounted to a wall of the carrier 20, such as the wall 23. As depicted, the heater 70 is mounted to the outer surface 22, but can be mounted to the inner surface 21. In an embodiment, the heater 70 is a PTC heater. The heater 70 warms up the surface 21 or wall 23 and causes the air inside the assembly 10 to warm up so that condensation is inhibited from forming on the inside surface 31 of the diffuser 30.

Figure 3A:
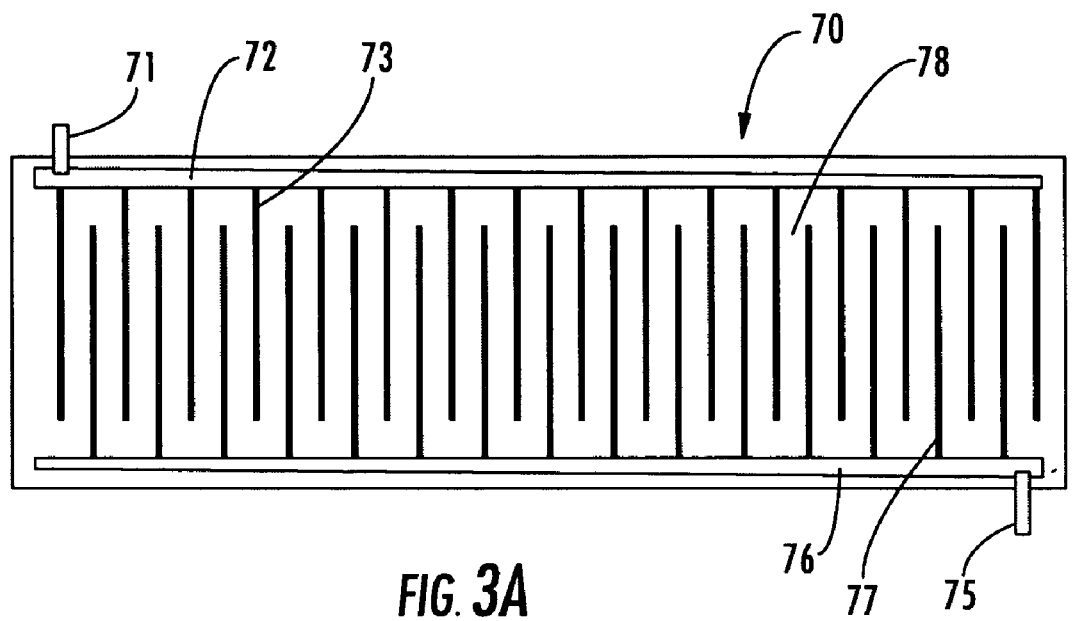
FIG. 3A is plan view of an exemplary PTC heater.

FIG. 3A depicts an exemplary PTC heater 70. The heater 70 includes a first terminal 71 mounted to a first buss bar 72. A plurality of conductors 73 extend from the buss bar 72. Similarly, a second terminal 75 is mounted to a second buss bar 76 from which a plurality of conductors 77 extend. As depicted, the buss bar 72 and 76 may be tapered. Between the plurality of conductors 73, 77 extending from the bus bars 72, 76 is a conductive material 78 that varies in conductivity based on the temperature of the material 78. Thus, when the material 78 reaches a certain temperature, such as 70 degrees Celsius, the material 78 ceases to conduct. Thus, an advantage of using a PTC heater is that there is no need to provide a controller such as might be needed for a constant resistance heater. However, a constant resistance heater, if provided with a suitable controller, could also be used in a similar manner. It is noted that PTC and fixed resistance heaters can be made in any number of different configurations. Such heaters can be bent or maneuvered into different shapes, including three dimensional shapes.

Figure 3B:
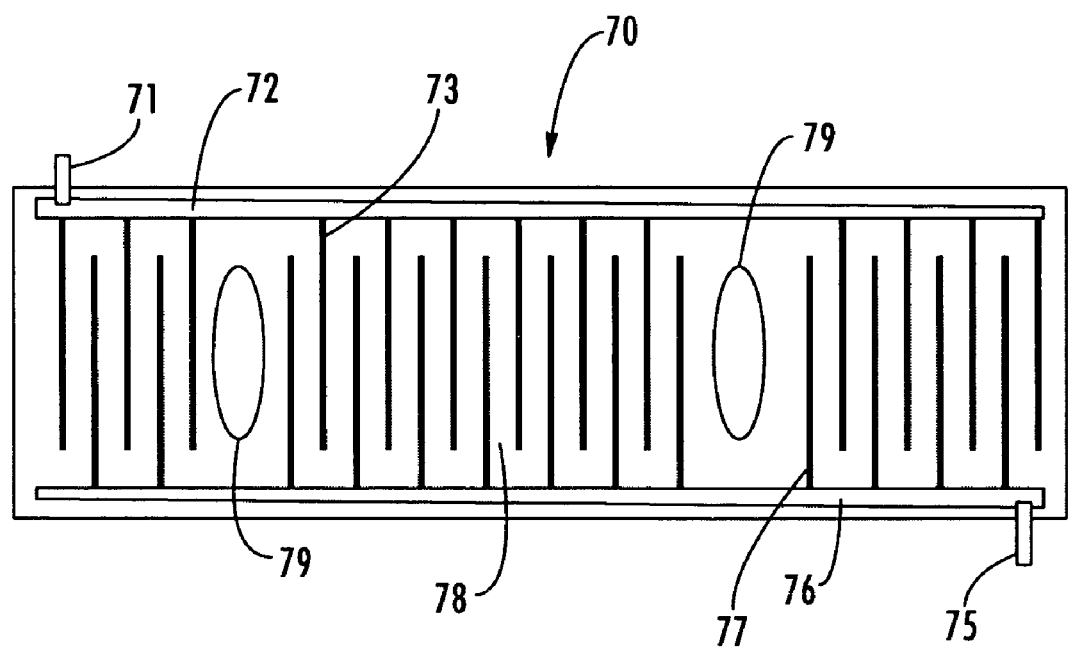
FIG. 3B is a plan view of an alternative exemplary PTC heater.

FIG. 3B depicts an alternative exemplary embodiment of a PTC heater. While similar to the heater 70 depicted in FIG. 3a, the heater 70 depicted in FIG. 3b includes a plurality of holes 79. The use of the holes 79 will be discussed in greater detail below.

Figure 4:
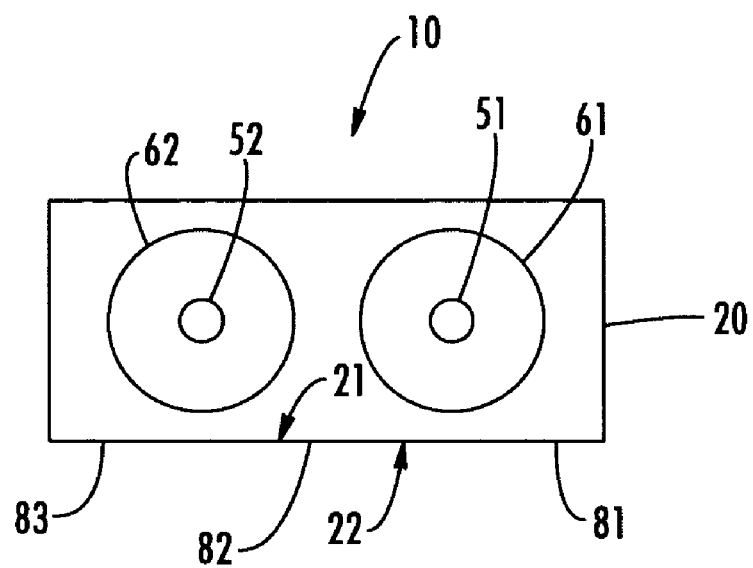
FIG. 4 is a front view of an exemplary headlight assembly.

Turning next to FIG. 4, a front view of an exemplary headlamp assembly 10 is illustrated. As previously noted, given the wide variation possible in the shape of a headlight assembly, the configuration shown is simplified and is for illustrative purposes. The headlamp assembly 10 includes a first bulb 51 and a second bulb 52 that may be positioned within a reflector 61 and 62, respectively. The bulbs 51, 52 are configured to illuminate the area in front of the vehicle and can be a high beam and a low beam bulb, respectively. In an embodiment, a third bulb (not shown) could be provided for use as a turn-signal bulb. The bulbs 51, 52 are packaged in a carrier 20 that combines with other structural portions of the front end of the vehicle to form an enclosure around the bulbs. While not shown for purposes of the illustration, a diffuser such as depicted in FIGS. 1 and 2 would normally be mounted along the front of the carrier.

While somewhat dependent on air flow, condensation typically forms near the areas illustrated by elements 81, 82 and 83. This is because warmer air rises, thus locations between and below the bulbs tend to have the greatest levels of condensation.

Figure 5:
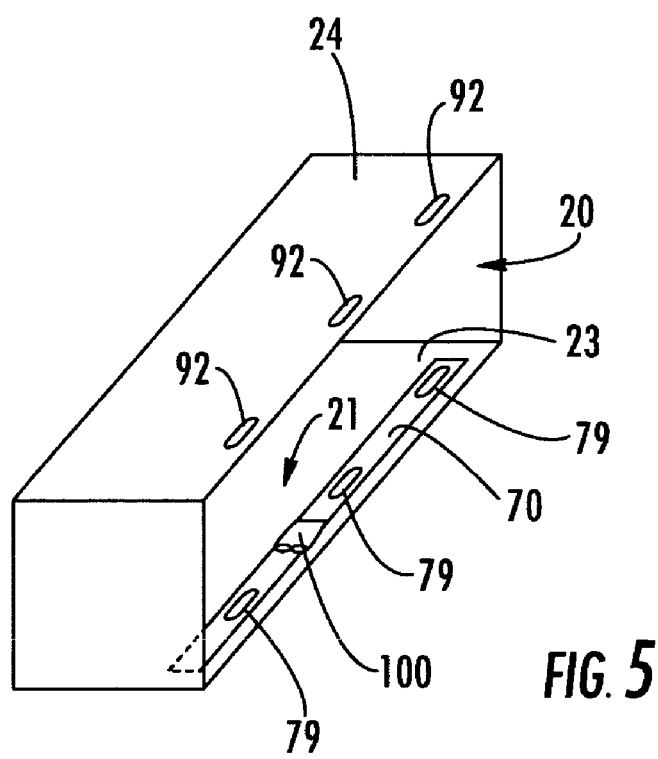
FIG. 5 is an isometric view of the headlight assembly depicted in FIG. 4.

FIG. 5 is an isometric illustration of the headlamp assembly 10 shown in FIG. 4 with the bulbs and reflectors obscured by the wall 24 of the carrier 20. However, the wall 24 need not be opaque. The heater 70 is shown mounted to the inner surface 21 of the wall 23 of the carrier 20. In another embodiment, the heater 70 could be mounted to the outer surface 22 of the wall 23 (as illustrated in FIG. 1), or any other wall of the carrier 20. In an alternative embodiment, the heater 70 could be mounted on the inner surface 21 of the wall 23 but hidden from view by a piece of decorative trim 100, which is shown as a relatively short piece of trim but could extend the length of the assembly 10 to substantially occlude the heater 70 from view. In an alternative embodiment, the heater 70 could be mounted on the inner surface 21 of the wall 23 but in a visible manner without the trim 100. In such an embodiment, the heater 70 could be formed on a decorative Mylar substrate and the decorative Mylar substrate could be mounted facing up so that the heater 70 provides an aesthetically pleasing appearance.

Regardless of whether the heater 70 is mounted on the inner surface 21 or outer surface 22 of the wall 23, the heater 70 can include one or more holes 79. These holes 79 can be aligned with one or more vents 25 (FIG. 1) in the wall 23. Thus, one or more passageways can be formed in the wall 23 of the carrier 20 and the heater 70. When power is applied to the heater 70, the resultant heat causes the surrounding air temperature to rise and the warmer air rises. The one or more passageways thus provide a path for air to enter, warm up, and then travel to the enclosure surrounding the bulbs. The warm air flows across the inner surface of the diffuser (see FIG. 2) and causes the condensation to evaporate. To enhance the airflow, one or more vents 92 can be provided on the wall 24 of the carrier 20 so that the moisture may be carried away from the enclosure. While the vents are visible for purposes of illustration, it is preferable that the vents be configured so that an individual viewing the front of the vehicle cannot see the vents.

While the heater 70 can provide heat along the entire length of the heater 70, to maximize the removal of condensation, the areas where condensation is most likely to form can be configured to provide higher heat output. Thus, in the examples depicted in FIGS. 4 and 5, the ends and the middle portion of the heater 70 could be configured to provide greater heat output.

Naturally, the heater 70 needs to be mounted to the carrier 20 in a manner that ensures the heater 70 does not come unattached during the life of the vehicle. This may be accomplished, for example, with adhesives or fasteners. The heater 70 can also be overmolded to become part of the carrier 20. If overmolded, the heater 70 and carrier 20 can still include one or more holes and vents that form one or more passageways that allow warmer air to enter the enclosure.

Referring back to FIG. 2, in an embodiment, the heater 70 may remain in an "on" condition to prevent the formation of condensation. To increase efficiency, however, the heater 70 can be activated based on environmental factors such as temperature and humidity and the velocity of the vehicle. For example, a controller 80 may be provided that determines whether the heater 70 should be actuated. The controller 80 is electrically coupled to the heater and may be part of a heater control system 5 to control whether the heater 70 is turned on or off. Thus, if the vehicle includes sensors to measure environmental factors, the controller 80 may be provided with software that controls whether the heater 70 is turned on or not. Alternatively, if the controller 80, which may be a separate processor and may be incorporated into some other processor that performs multiple tasks, receives information regarding the weather conditions from external sources, this information can be used to determine whether to actuate the heater 70. In this manner, the use of the heater 70 may be limited to times when the occurrence of condensation is a realistic possibility.

Although the detailed description has focused on describing the heater as being adapted to reduce condensation on the inner surface of the headlamp assembly, it is noted that the heater according to the present invention has the additional advantage of preventing or deicing ice build up on the outer surface of the headlamp assembly.

Variations and modifications of the foregoing are within the scope of the present invention. It should be understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A heated vehicle light assembly comprising:
an enclosure including:
  a carrier configured for containing at least one light bulb, the carrier having a wall, the wall including at least one of a side wall, a back wall, a bottom wall and a top wall, the wall having an inner surface and outer surface; and
  a cover mounted to the carrier, and the cover being adapted to allow light from the light bulb to pass therethrough; and
  a heater having a plurality of conductors between buss bars, and the heater mounted directly to the wall of the carrier, the heater configured to prevent, during operation, at least one of formation of condensation on the cover and build up of ice on the cover.

2. The heated vehicle light assembly as set forth in claim 1, wherein the heater is a positive temperature coefficient heater.

3. The heated vehicle light assembly as set forth in claim 2, wherein the heater is mounted to the outer surface of the wall via an adhesive.

4. The heated vehicle light assembly as set forth in claim 2, wherein the heater is mounted to the carrier via an overmolding process.

5. The heated vehicle light assembly as set forth in claim 2, wherein the carrier further comprises a second wall, wherein the carrier includes at least one vent in the wall and at least one vent in the second wall, wherein the heater includes at least one hole corresponding to the at least one vent in the wall, whereby the hole in the heater and the vent in the wall allows warm air to enter the assembly and the vent in the second wall allows moist air to exit the assembly.

6. A system for use in enclosing a light bulb in a light assembly, the system comprising:
  a carrier configured to interface with the light bulb, the carrier including a first wall, a second wall and a third wall to define an open sided housing, the first wall having an inner side and an outer side;
  a diffuser associated with the carrier, the diffuser adapted to close the open sided housing of the carrier, the diffuser having a first side and a second side, the diffuser configured to allow light to emit from the assembly; and
  a positive temperature coefficient heater mounted to one of the walls of the carrier away from the diffuser, the positive temperature coefficient heater configured to prevent at least one of formation of condensation on the first side of the diffuser and ice build up on the second side of the diffuser.

7. The system as set forth in claim 6, wherein the positive temperature coefficient heater is mounted to the first wall through the use of an adhesive.

8. The system as set forth in claim 6, wherein the positive temperature coefficient heater is mounted to the first wall through the use of an overmolding process.

9. The system as set forth in claim 6, further comprising a piece of trim, wherein the positive temperature coefficient heater is mounted to the inner side of the first wall of the carrier and the piece of trim is mounted so as to at least partially occlude the positive temperature coefficient heater.

10. The system as set forth in claim 6, wherein the carrier includes at least one vent in the first wall, and the heater includes at least one hole, wherein the at least one vent and hole are configured to correspond to allow warm air to more readily enter the assembly.

11. The system as set forth in claim 10, the second wall including at least one vent, whereby the at least one vent in the first wall, the at least one hole in the heater, and the at least one vent in the second wall are configured to improve the flow of air in the assembly to reduce the occurrence of condensation.

12. A vehicle light assembly for illuminating an area near a vehicle, comprising:
 at least one light emitting diode lamp;
 an enclosure configured to aid in protecting the light emitting diode lamp from the environment, the enclosure comprising:
  a carrier including a first wall, the first wall including at least one of a side wall, a back wall, a bottom wall and a top wall, the first wall including an inner side and outer side;
  a transparent cover configured to allow light to emit from the assembly, the cover having a first side and a second side; and
  a heater having a plurality of conductors between buss bars, and the heater mounted directly to the first wall of the carrier which is connected to the cover, the heater configured to prevent, during operation, at least one of formation of condensation on the cover and build up of ice on the cover.

13. The assembly as set forth in claim 12, wherein the heater is a positive temperature coefficient heater.

14. The assembly as set forth in claim 13, wherein the positive temperature coefficient heater is mounted to the outer side of the first wall via an adhesive.

15. The assembly as set forth in claim 14, wherein the positive temperature coefficient heater is mounted to the first wall via an overmolding process.

16. The assembly as set forth in claim 12, wherein the first wall includes at least one vent and the heater includes at least one hole, the at least one vent and at least one hole configured to provide at least one passageway, whereby warm air can be introduced into the assembly by the at least one passageway.

17. The assembly as set forth in claim 16, the carrier further comprising a second wall, wherein the second wall includes at least one vent, whereby the at least one passageway works in combination with the vent in the second wall so as to inhibit the accumulation of condensation on the first side of the transparent cover.

18. The assembly as set forth in claim 17, further comprising a controller for actuating the heater, the controller configured to actuate the heater in response to data regarding at least one environmental condition.

* * * * *